United States Patent [19]

Chang et al.

[11] 4,025,407

[45] May 24, 1977

[54] METHOD FOR PREPARING HIGH SOLIDS FILMS EMPLOYING A PLURALITY OF CURING MECHANISMS

[75] Inventors: Wen-Hsuan Chang; Marco Wismer, both of Gibsonia, Pa.

[73] Assignee: PPG Industries, Inc., Pittsburgh, Pa.

[22] Filed: Nov. 4, 1974

[21] Appl. No.: 520,767

Related U.S. Application Data

[63] Continuation-in-part of Ser. No. 140,578, May 5, 1971, abandoned.

[52] U.S. Cl. .................. 204/159.14; 204/159.15; 204/159.16; 204/159.19; 260/22 CB; 260/22 T; 260/22 TN; 260/22 EP; 260/23 EP; 260/18 EP; 260/42.28; 260/42.29; 260/835; 260/837 R; 260/842; 260/844; 260/849; 260/850; 260/851; 260/858; 260/859; 260/861; 260/872; 260/873; 427/44; 427/54; 428/425; 428/457; 428/460; 428/458; 428/461
[51] Int. Cl.$^2$ .................. C08F 8/00; C08G 18/00; C08G 63/00
[58] Field of Search ............... 204/159.14, 159.15, 204/159.16, 159.17, 159.19; 260/859, 861

[56] References Cited

UNITED STATES PATENTS

| 2,673,151 | 3/1954 | Gerhart ................................. 95/7 |
| 2,921,006 | 1/1960 | Schmitz et al. ............... 204/159.15 |
| 3,380,950 | 4/1968 | Blomeyer ........................ 260/830 P |
| 3,660,217 | 5/1972 | Kehr et al. ............................ 161/68 |
| 3,670,049 | 6/1972 | Stein et al. ..................... 260/859 R |
| 3,700,752 | 10/1972 | Hutchinson .................... 260/859 R |

OTHER PUBLICATIONS

Patton, Alkyd Resin Technology, Interscience Publishers, 1902, p. 175.

*Primary Examiner*—Richard B. Turer
*Attorney, Agent, or Firm*—George D. Morris

[57] ABSTRACT

Conventional thermosetting resins are thinned with radiation sensitive or actinic light sensitive materials and then subjected to a dual cure wherein the material is first subjected to ionizing irradiation or actinic light and then to the conventional curing mechanism of the thermosetting resin. The resultant film contains the properties of both the radiation sensitive material and the conventional thermosetting resin and is easily applied as a coating.

15 Claims, No Drawings

METHOD FOR PREPARING HIGH SOLIDS FILMS EMPLOYING A PLURALITY OF CURING MECHANISMS

CROSS-REFERENCE TO RELATED APPLICATIONS

This application is a continuation-in-part of application Ser. No. 140,578, filed May 5, 1971, now abandoned.

BACKGROUND OF THE INVENTION

The use of conventional radiation insensitive thermosetting resins for coating compositions is sometimes undesirable because of the necessity for thinning the resins with solvents to provide easy application to substrates. The use of solvents is costly as the solvents do not go into the final cured coating and must be removed from the coating composition. The removal of solvent, of course, also involves a pollution problem.

To alleviate the above problems, ionizing irradiation sensitive and actinic light sensitive materials have been developed. These radiation sensitive materials are ethylenically unsaturated monomers which cure by ionizing irradiation or actinic light to form coatings wherein essentially all of the material goes into the cured coating or film. In other words, essentially no solvents are necessary. The problem with these coatings is that in many cases the coating cured in this manner is not flexible and the properties of these coatings cannot be easily modified to meet the requirements of some end uses as can the conventional radiation insensitive thermosetting resins.

It has now been discovered that radiation sensitive liquid materials may be used as thinners for conventional radiation insensitive thermosetting resins. A mixture of the radiation sensitive material and radiation insensitive thermosetting resin may be subjected first to radiation to crosslink the radiation sensitive material and then to moisture, oxidation or heat to crosslink the radiation insensitive thermosetting resin. Alternatively, the mixture may be subjected first to moisture, oxidation or heat to crosslink the radiation insensitive thermosetting resin and then to radiation to crosslink the radiation sensitive material.

During exposure of the mixture to radiation, the degree of crosslinking of the radiation sensitive material is usually substantially complete. During exposure to moisture, oxidation or heat, the degree of crosslinking of the radiation insensitive thermosetting resin is usually substantially complete. When considered from the standpoint of the mixture, it may be said that the mixture is partially cured during the first exposure and completely cured after the second exposure.

Films of the mixture which are subjected to the dual exposures described above form flexible, abrasion resistant films. In some systems the radiation sensitive material and the radiation insensitive thermosetting resin interreact during one or both of the exposures. In other systems the radiation sensitive material and the radiation insensitive thermosetting resin do not interreact during either exposure.

The radiation sensitive coating materials may be any radiation curable organic materials. The most useful radiation sensitive organic materials are polyester resins and acrylic resins.

The polyester resins comprise unsaturated polyesters, solubilized in vinyl monomers. The unsaturated polyesters are ordinarily prepared from alpha-beta ethylenically unsaturated polycarboxylic acids and polyhydric alcohols.

The ethylenically unsaturated polycarboxylic acids include such acids as:
 maleic acid
 fumaric acid
 aconitic acid
 mesaconic acid
 citraconic acid
 itaconic acid
and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:
 hydroxypivalyl mono(hydroxypivalate)
 ethylene glycol
 diethylene glycol
 triethylene glycol
 polyethylene glycol
 propylene glycol
 dipropylene glycol
 polypropylene glycol
 glycerol
 neopentyl glycol
 pentaerythritol
 trimethylol propane
 trimethylol ethane
and the like. The preferred polyols for the purposes of this invention have a molecular weight of less than about 2000 and consist essentially of carbon, hydrogen and oxygen. The polyhydric alcohols are generally employed in an equal molar-ratio to the total acid components, or as an excess, as, for example, about 20 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:
 succinic acid
 adipic acid
 suberic acid
 azelaic acid
 sebacic acid
 isophthalic acid
 terephthalic acid
 tetrachlorophthalic acid
and the like. As in the case of the ethylenically unsaturated acids, the anhydrides of these acids, where the anhydrides exist, are, of course, embraced in the term acid, since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever, the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:
 styrene
 alpha-methylstyrene
 divinylbenzene
 diallyl phthalate
 methyl acrylate
 methyl methacrylate
 hexyl acrylate
 octyl acrylate
 octyl methacrylate
 diallyl itaconate
 diallyl maleate
and the like. The preferred vinyl monomers are liquid compounds, soluble in the polyester components. Such monomers should preferably be free of non-aromatic carbon-carbon conjugated double bonds. The vinyl monomer as exemplified in the above list may be employed over a broad range. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol or neopentyl glycol as the diol and maleic acid and adipic acid as the carboxylic acids with styrene or diallyl phthalate or vinyl toluene as the solubilizing monomer.

The acrylic compositions which may be used as the radiation sensitive materials in this invention may be esters or amides of acrylic or methacrylic acid or comonomers of such an ester with another copolymerizable monomer. Suitable esters include those of alcohols containing 1 to 8 carbon atoms such as methyl acrylate, methyl methacrylate, hydroxy ethyl acrylate, butyl methacrylate, octyl acrylate, and 2-ethoxy ethyl methacrylate. suitable amides include butoxymethyl acrylamide, methacrylamide, tertiary butyl acrylamide and other low melting alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, for example, itaconate esters, maleate esters, and allyl compounds. Alkylene dimethacrylates and diacrylates, such as 1,3-butylene dimethacrylate, and the like, and triacrylates and trimethacrylates, such as trimethyl propane trimethylacrylate, and the like, may also be used. The preferred acrylates are polyacrylates and methacrylates, such as diacrylates, di-methacrylates, tri-acrylates, tri-methacrylates, and the like, such as acryloxypivalyl acryloxypivalate, bis-(acryloxyethyl) hexahydrophthalate and polymers thereof, bis-(acryloxyethyl) phthalate, and the like. Examples of these materials are found in U.S. Pat. No. 3,455,802 and British Pat. Nos. 1,162,722 and 1,162,721. The preferred materials are ethylenically unsaturated acrylic monomers.

The conventional thermosetting resins, which are not very radiation sensitive or actinic light sensitive, are those materials which normally cure by either oxidation, moisture, or heat, such as radiation insensitive polyurethane, radiation insensitive alkyds, radiation insensitive polyepoxides, radiation insensitive thermosetting acrylics, radiation insensitive aminoplast resins, and radiation insensitive Epon esters. Examples of the radiation insensitive thermosetting resins that may be used are given below:

RADIATION INSENSITIVE ALKYD RESINS

Any of the various radiation insensitive alkyd resins produced from essentially any saturated polybasic acid and saturated polyfunctional alcohol can be used. For example, the alkyd may be made from such polyfunctional acids as phthalic acid, isophthalic acid, succinic acid, trimellitic acid, adipic acid, azelaic acid, sebacic acid, fatty acids and the like, as well as from anhydrides of such acids. The term "saturated"embraces "aromatically unsaturated" for the reasons developed more fully hereinbefore. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The radiation insensitive alkyd resin may be non-oil-modified or modified with a non-drying, semi-drying or drying oil. Coconut oil, tung oil, linseed oil and soybean oil are among those often employed. The radiation insensitive alkyd resin can also contain a monobasic acid such as benzoic acid, or it can be a polyester containing adipic acid or a similar acid along with various glycols and/or polyols. An example of a useful radiation insensitive alkyd is linseed oil-modified glycol adipate.

It is noted that radiation insensitive alkyd resins are thermoset by the addition of crosslinking agents, such as aminoplasts, phenolic resins, or by oxidative curing when drying or semi-drying oils are incorporated in the resins.

RADIATION INSENSITIVE POLYURETHANE RESINS

The radiation insensitive polyurethane comprise another class of thermosetting resins which may be cured by the method of this invention. Essentially, the radiation insensitive polyurethanes are condensation products of a polyisocyanate and a compound having at least two reactive hydrogen atoms, i.e., hydrogen atoms determinable by the Zerewithinoff method. The useful active hydrogen-containing compounds may be polyesters prepared from polycarboxylic acids and polyhydric alcohols, polyhydric polyalkylene ethers having at least two hydroxy groups, polythioether glycols, polyester amides, etc.

The polyesters of polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1, 4-dicarboxylic, polyacrylic, naphthalene-1,2-dicarboxylic, fumaric, itaconic, etc., acids, with polyalcohols, such as ethylene glycol, diethylene glycol, pentaglycol, glycerol, sorbitol, triethanolamine, di-(beta-hydroxyethyl)ether, etc., and/or aminoalcohols such as ethanolamine, 3-aminopropanol, 5-aminopentanol-1, 10-aminodecanol, 6-amino-5-methylhexanol-1,-p-hydroxymethylbenzylamine, etc., and with mixtures of the above polyalcohols and amines, ethylenediamine, 3-methylhexamethylenediamine, decamethylenediamine and m-phenylenediamine, etc., and/or amino-alcohols, etc. In the esterification or amide formation the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol, 2-methylpentanediol-2,4, 2-ethylhexanediol-1, 3,hexamethylene glycol, styrene glycol, diethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1200, 2000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, propylene-1,2-diisocyanate, cyclohexylene diisocyanate, m-phenylene diisocyanate, 2,4-tolylene diisocyanate, 3,3'-dimethoxy-4,4'-biphenylene diisocyanate, 3,3'-dichloro-4, 4'-biphenylene diisocyanate, triphenylmethane triisocyanate, 1,5-naphthalene diisocyanate, hydrogenated toluene diisocyanate, methylene bis(cyclohexylisocyanate), isophorone diisocyanate, trimethylhexamethylene diisocyanate, lysine diisocyanate methyl ester or polyisocyanates in a blocked or inactive form, such as the bisphenyl carbonates of tolylene diisocyanate and 1,5-naphthalene diisocyanate, etc.

RADIATION INSENSITIVE THERMOSETTING ACRYLIC RESINS

There are three types of radiation insensitive thermosetting acrylics that are becoming increasingly important. One class is radiation insensitive interpolymers of an unsaturated carboxylic acid amide with at least one other monomer having a $CH_2 = C<$group, said interpolymer being characterized by having amido hydrogen atoms replaced by the structure $—RCHOR_1$, wherein R is selected from the group consisting of hydrogen and saturated lower aliphatic hydrocarbon radicals and $R_1$ is a member of the class consisting of hydrogen and lower alkyl radicals, such as those disclosed in U.S. Pat. Nos. 2,870,117, 2,978,434, 3,035,965 and 3,079,434. Another class is radiation insensitive interpolymers of a hydroxy-alkyl ester of an ethylenically unsaturated carboxylic acid and at least one other ethylenically unsaturated monomer copolymerizable therewith, such as are described in U.S. Pat. Nos. 2,681,897 and 3,084,184. A third class comprises radiation insensitive crosslinking carboxyl polymers.

The radiation insensitive interpolymer of an unsaturated carboxylic acid amide is a preferred radiation insensitive thermosetting resin to be cured by this invention. In this embodiment, acrylamide or some other polymerizable amide is polymerized with one or more ethylenically unsaturated monomeric compounds, and the resulting interpolymer reacted with an aldehyde to form one component of the coating compositions of this invention.

Among the monomers which may be polymerized with acrylamide are included methyl acrylate, ethyl acrylate, isobutyl acrylate, hexyl acrylate, styrene, vinyltoluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, hydroxyacrylamide, substituted acrylics, such as hydroxymethyl methacrylate, hydroxyethyl acrylate, and the like. In general, it is preferred that the monomer utilized contain a single $CH_2 = C<$group in terminal position, and an especially preferred group of monomers includes ethyl acrylate, butyl acrylate, methyl acrylate, styrene, vinyl toluene, acrylic acid, and monomethyl styrene.

It has been found that preferred radiation insensitive unsaturated carboxylic acid amide interpolymers are obtained when at least two monomeric compounds are interpolymerized with the acrylamide. In this manner, it is possible to tailor the radiation insensitive interpolymer to have any desired degree of hardness or flexibility. For example, one useful radiation insensitive ternary interpolymer is prepared from acrylamide, ethyl acrylate and styrene. Also, a small amount of methyl methacrylate tends to improve the hardness of two-component interpolymers where one of the monomers is of the type which forms soft homopolymers, and a small quantity of an acid monomer, such as acrylic acid, methacrylic acid, crotonic acid, maleic acid or fumaric acid, has been found to be particularly useful as an internal catalyst in that it imparts to the coating composition desirable fast curing properties. In place of acrylamide, any other polymerizable amide, for example, methacrylamide or itaconic diamide may be utilized.

In another preferred embodiment of this invention, a second important class of radiation insensitive thermosetting acrylic resins comprising the hydroxyalkyl ester of an ethylenically unsaturated carboxylic acid is cured. Any crosslinking agent can be used, such as aminoplast resins, etc.

Preferred polymerizations of the class described are those containing hydroxyalkyl esters in which the alkyl group has up to about 12 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid,, fumaric acid and itaconic acid, in which at least one of the esterifying groups is hydroxyalkyl. Such esters include bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxpropyl), and similar alkylene glycol monoesters of maleic acid and similar acids, can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocargons, unsaturated esters of organic and inorganic acids, esters of unsaturated acids, nitriles, unsaturated acids, and the like. Examples of such monomers include styrene, butadiene-1,3, 2-chlorobutene, alphamethyl styrene, alpha-chlorostyrene, 2-chlorobutadiene-1,3, 1,1-dichloroethylene, vinyl butyrate, vinyl acetate, allyl chloride, dimethyl maleate, divinyl benzene, diallyl itaconate, triallyl cyanurate, and the like.

A third important class of radiation insensitive thermosetting acrylics that may be cured herein comprises the radiation insensitive crosslinking carboxyl-containing polymers. The radiation insensitive thermosetting carboxyl polymers that may be used here consist generally of radiation insensitive acrylic resins or radiation insensitive modified acrylic resins containing from 5 to 40 percent by weight of ethylenically unsaturated acid which is crosslinked with a compound containing functional groups such as epoxies, polyols, amines and melamines.

Acrylic monomers which may be used to form radiation insensitive resins are acrylates, such as ethyl acrylate, butyl acrylate, hexyl acrylate; methacrylates, such as methyl methacrylate, isopropyl methacrylate, hexyl methacrylate; maleate esters such as dibutyl maleate; and fumarates, such as ethyl fumarate; and the others.

The ethylenically unsaturated acids which may be used are those such as acrylic acid, methacrylic acid, fumaric acid, maleic acid, itaconic acid, and others.

RADIATION INSENSITIVE POLYEPOXIDE RESINS

In the preferred embodiments of this invention, the radiation insensitive polyepoxides have an average of more than 1.0 1,2-epoxy groups per average molecular weight. Among the polyepoxides which can be used herein are the polyglycidyl ethers of polyphenols, such as Bisphenol A. These may be attained, for example, by etherification of a polyphenol with epichlorohydrin or dichlorohydrin in the presence of an alkali. The phenolic compound may be 2,2-bis(4-hydroxyphenyl) propane, 4,4'-dihydroxybenzophenone; 1,1-bis(p-hydroxyphenyl) ethane, 2,2-bis(4-hydroxy-tertiarybutylphenyl) propane, bis(2-hydroxy-naphthyl)methane, 1,5-dihydroxynaphthalene, or the like. The polyphenol can also be a novolak resin or a similar polyphenol resin.

Such polyglycidyl ethers of polyphenols correspond to the average formula:

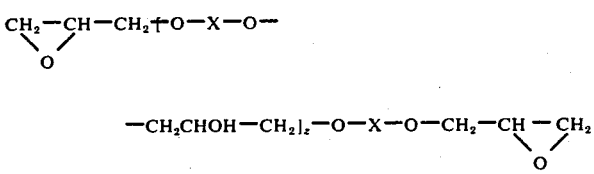

in which X represents an aromatic radical and z represents a whole or fractional small number.

Examples of this class of polyepoxides are the reaction products of Bisphenol A and epichlorohydrin, which correspond to the structure:

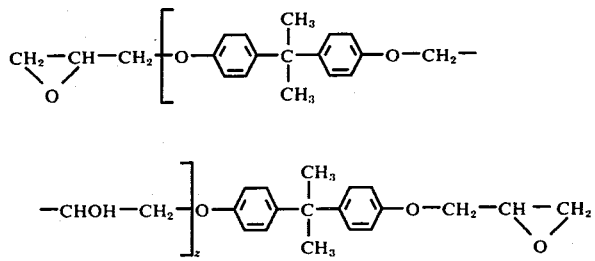

in which z represents a whole or fractional small number.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol, trimethylolpropane, and the like.

The radiation insensitive epoxy esters are the partial fatty acid esters of the above-mentioned glycidyl polyethers of polyhydric alcohols and glycidyl polyethers of polyhydric phenols. Linseed oil, tall oil, cocoanut oil, soybean oil, and castor oil are examples of fatty acids that may be used to produce these resins.

RADIATION INSENSITIVE AMINOPLAST RESINS

The radiation insensitive aminoplast resins comprise another class of polymer useful in the invention. These include the radiation insensitive amine-aldehyde resins, as for example, an aldehyde condensation product of melamine. Generally, the aldehyde employed is formaldehyde. These radiation insensitive aldehyde condensation products contain methylol or similar alkylol groups.

The radiation insensitive amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

The preferred radiation insensitive aldehyde condensation product of melamine is hexakis (methoxymethyl) melamine.

The radiation insensitive aminoplasts may be used alone as the principal film forming component of the coating composition, but they are more preferably employed as crosslinking agents for other radiation insensitive compounds such as radiation insensitive polyesters, radiation insensitive polyacrylates, or other radiation insensitive polymers containing pendant or terminal hydroxyl, carboxyl, amino, mercapto or other groups containing active hydrogen.

The radiation sensitive materials and the radiation insensitive thermosetting resins are simply mixed together to form a blend. The proportion of each component may be varied greatly, but it is preferred to use as much radiation sensitive monomer as is needed to solubilize the radiation insensitive thermosetting resin so that the blend may be applied to a substrate with relative ease. Generally, the blend will contain from about 20 to about 90 percent by weight of the radiation sensitive material.

The coating compositions may contain photosensitizers to aid in the actinic light curing of the composition. Various common photosensitizers are benzoin, benzophenone, hydroxy benzophenone, substituted benzoins, and the like. Generally, the coating may comprise from about 0.1 percent by weight of the photosensitizer to about 5 percent by weight of the photosensitizer.

The blends are partially cured by first subjecting to either ionizing irradiation or to actinic light. However, an alternative method is by first partially curing by the curing mechanism of the thermosetting resin and subsequently curing by ionizing irradiation or actinic light. In the preferred embodiment, the blends are partially cured by first subjecting to ionizing irradiation or actinic light. Ionizing irradiation and actinic light may be used simultaneously or in sequence.

The term "ionizing irradiation", as used herein, means high energy radiation and/or the secondary energies resulting from conversion of this electron or other particle energy to neutron or gamma radiation, said energies being at least equivalent to about 100,000 electron volts. While various types of ionizing irradiation are suitable for this purpose, such as X-ray and gamma and beta rays, the radiation produced by accelerated high energy electons has been found to be very conveniently and economically applicable and to give very satisfactory results. However, regardless of the type of ionizing irradiation and the type of equipment used for its generation or application, the use thereof in the practice of the invention as described herein is contemplated as falling within the scope of this invention so long as the ionizing irradiation is equivalent to at least about 30,000 electron volts.

While there is no longer limit to the electron energy that can be so supplied advantageously, the effects desired in the practice of this invention can be accomplished without having to go to above about 20,000,000 electron volts. Generally, the higher the electron energy used, the greater is the depth of penetration into the massive structure of the materials to be treated. For other types of ionizing irradiation, such as gamma and X-rays, energy systems equivalent to the above range of electron volts are desirable.

The term ionizing irradiation has been defined in the prior art as radiation possessing an energy at least sufficient to produce ions or to break chemical bonds and thus includes also radiations such as "ionizing particle radiation" as well as radiations of the type termed "ionizing electromagnetic radiation".

The term ionizing particle radiation has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

Ionizing electromagnetic irradiation is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, Cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The blend will cure and adhere to the substrate using any total dosage between about 0.2 megarads and 50 megarads. A "rad" is defined as that amount of radiation required to supply 100 ergs per gram of material being treated and a "megarad" is $10^6$ rads. The total dosage is the total amount of irradiation received by the coating.

The coatings may also be cured and adhered to the substrate by subjecting them to actinic light such as ultraviolet light. In general, the use of wave lengths in which sensitivity to actinic light occurs is approximately 180 to 400 nanometers. Various suitable sources of actinic light are available in the art including, by way of example, quartz mercury lamps, ultraviolet cured carbon arcs, and high flash lamps.

The cure of the blend is then completed by using the conventional curing process for the radiation insensitive thermosetting resin. The conventional curing processes for the radiation insensitive thermosetting resins are aging, oxidation, moisture cure and heat cure.

The radiation insensitive thermosetting resins which cure by oxidation are radiation insensitive polyurethanes, radiation insensitive polyepoxides and radiation insensitive Epon esters. Thus, radiation insensitive polyurethanes, radiation insensitive polyepoxides and radiation insensitive Epon esters of the two package type containing polyols and of the drying oil type, cure by merely exposing them to air.

The radiation insensitive thermosetting resins which cure by moisture are radiation insensitive polyurethanes such as those isocyanate containing prepolymers and the like. This cure is carried out by keeping in open air for a certain period of time in the presence or absence of catalysts so that moisture from the air will cure the resins.

The radiation insensitive thermosetting resins which are cured by heat are resins such as those containing hydroxyl groups such as radiation insensitive acrylates or radiation insensitive urethanes, and radiation insensitive blocked isocyanates; radiation insensitive phenol or amino resin cured polyols derived from radiation insensitive polyesters, radiation insensitive polyurethanes or radiation insensitive polyacrylates. Thus, radiation insensitive urethane polyols, radiation insensitive acrylate polyols and radiation insensitive polyester polyols may be reacted with a radiation insensitive polymer containing block isocyanates to form the radiation insensitive thermosetting resins or radiation insensitive urethane, radiation insensitive acrylate, and radiation insensitive polyester polyols may be reacted with an amino resin or phenol formaldehyde resin to form the radiation insensitive thermosetting resin or radiation insensitive polyepoxides may be reacted with acids or anhydrides to form the radiation insensitive thermosetting resin. This method involves simply heating the blends at elevated temperatures for a period of time.

The properties of the cured blends vary with the type of radiation insensitive thermosetting resin used and the radiation sensitive material used; however, the films or coatings formed are generally flexible, abrasion resistant, stain resistant and have excellent salt spray resistance.

The blends are most useful as coating for many types of substrates and the preferred use is to apply the blend to a substrate and conduct the dual cure process in situ.

The following Examples set forth specific embodiments of the instant invention. However, the invention is not to be construed as being limited to these embodiments for there are, of course, numerous possible variations and modifications.

All parts and percentages in the Examples, as well as throughout the specification, are by weight unless otherwise indicated.

EXAMPLE 1

A thermosetting resin was formed by mixing a radiation sensitive monomer (3-acryloxypivalyl 3-acryloxypivalate) with a radiation insensitive aliphatic diisocyanate as follows:

A reactor was charged with 47.2 grams of a composition comprising 320 parts of polycaprolactone diol having a molecular weight of 1250, 14 parts trimethylolpropane, 160 parts of poly(neopentyl adipate) having a molecular weight of 3000, 252 parts of isophorone diisocyanate, and 3 parts of dibutyl tin dilurate and 80 grams of a composition comprising 112 parts of $TiO_2$, 200 parts of 3-acryloxypivalyl, 3-acryloxypivalate, and 28 parts of black tint. The reactants were kept at room temperature in the absence of moisture for 24 hours.

Six steel panels were coated with the above mixtures by the draw down technique and the films were immediately subjected to electron beam irradiation in a nitrogen atmosphere. The total dosage was 1, 3 and 5 megarads.

Three of the above coated panels were further moisture cured by heating at 140° F. for 24 hours. The properties of the six coated panels were tested below. The properties measured were pencil hardness and cure determined by the amount of rubs from an acetone soaked cloth the coating could endure without failure. The flexibility and adhesion is measured by the reverse impact test.

The reverse impact test is a test of the flexibility and the impact resistance of the coating, and is measured by dropping various weights from various heights onto a ½-inch diameter steel ball positioned on the coating until a failure in the coating arises. The reverse impact measured by dropping the weight on the ball on the reverse side of the coating. The test results are given in terms of inch pounds, which is a product of the weight in pounds and the distance in inches in which the weight was dropped.

The following are the results:

|  | 1 Mrad No Post Cure | 1 Mrad 140° F. 24 Hrs. | 3 Mrad No Post Cure | 3 Mrad 140° F. 24 Hrs. | 5 Mrad No Post Cure | 5 Mrad 140° F. 24 Hrs. |
|---|---|---|---|---|---|---|
| Film Thickness (Mils) | 0.5 | 0.5 | 0.5 | 0.5 | 0.5 | 0.5 |
| Pencil Hardness | Less Than B | 2H | B | 2H | B | H |
| Number of Acetone Rubs | 3 | 5 | 3 | 8 | 7 | 12 |
| Reverse Impact (inch lbs.) | Less Than 20 | 60 | Less Than 20 | 60 | Less Than 20 | 60 |

EXAMPLE 2

A thermosetting resin was formed by mixing actinic light sensitive monomers and an air drying varnish as follows:

To 6 grams of solvent free polyol reacted with drying oil were blended 14 grams of a copolymer of 70 percent 2-ethyl hexyl acrylate, 15 percent vinyl acetate, 10 percent hydroxyethyl acrylate, 5 percent acrylic acid dissolved as a 50 percent solids mixture in a composition comprising 69 percent 2-ethyl hexyl acrylate, 20 percent diacetone acrylamide, 10 percent hydroxyethyl acrylate and 1 percent benzoin.

A 3 mil film of the above blend was drawn down on a steel panel and cured under an ultraviolet lamp. The film was then post cured by air exposure.

The resulting film was strong and durable.

EXAMPLE 3

A polyurethane polyol designed to be cured with melamine resin was blended with an actinic light sensitive material and subjected to a dual cure as follows:

To 7 grams of a solvent free polyurethane polyol comprising 60.51 percent polycaprolactone diol of molecular weight 1250, 28.96 percent methylene bis(cyclohexyl isocyanate), 4.64 percent trimethylol propane, 4.54 percent isophorone diamine, and 1.35 percent monoethanol amine were added 3 grams of a methylated melamine (Cymel 301), 15 grams of the ultraviolet light sensitive material of Example 2 and 0.25 gram of toluene sulphonic acid catalyst. The mixture was then blended.

A 3 mil film of the above blend was drawn down on a steel panel and cured by ultraviolet light. The film was post cured by baking at 250° F. for 30 minutes and the resulting film was strong and had a good appearance.

EXAMPLE 4

A composition comprising 116 grams of hydroxyethyl acrylate, 280 grams of a melamine-formaldehyde resin (Cymel 301), 116 grams of a polycaprolactone-trimethylol propane reaction product having a hydroxyl equivalence of 180, 5 grams of catalyst, 2.5 grams of benzoin, and 2 grams of benzoyl peroxide was coated on to a panel. The thickness of the coating was 3 mils. The coating was then first subjected to ultraviolet light and subsequently cured by heating at 250° F. for 30 minutes. The resulting film was hard and glossy.

EXAMPLE 5

A coating composition comprising 116 grams of hydroxyethyl acrylate, 142 grams of a melamine-formaldehyde resin (Cymel 301), 2 grams of a 20 percent solution of toluene sulfonic acid in isopropyl alcohol of catalyst and 0.6 gram of benzoin was formed.

A coating of 3 mils thickness was applied to a steel substrate and the coating was cured by passing under an ultraviolet lamp and the coating was only partially cured. Another coating of three mils was subjected to 250° F. for one-half hour and this coating was only partially cured. A third coating of three mils was first subjected to ultraviolet light and then heated at 250° F. for one-half hour and this coating was completely cured to a hard, glossy surface.

EXAMPLE 6

A composition comprising 40 parts of an epoxy ester of 53.8 percent air drying fatty acids and 46.2 percent reaction product of Bisphenol A and a glycidyl ether of Bisphenol A (Epon 829) and 60 parts of an acrylate formed by reacting 1.1 equivalent of acrylic acid with 1 equivalent of a polyester of 2.1 mols of neopentyl glycol and 1 mol of hexahydrophthalic anhydride with an acid catalyst was coated on to a panel and subjected to electron beam bombardment at 300 milliamps and a line speed of 35 feet per minute. The material was then tested for solvent resistance by rubbing with acetone until the coating was removed. The coating was able to withstand 25 rubs.

The coating material was then allowed to further cure by oxidation by leaving it on a shelf for one year. The coating was then retested by rubbing with alcohol and the coating was able to withstand 100 rubs without damage.

EXAMPLE 7

A composition comprising 50 parts of polyethylene glycol diacrylate and 50 parts of an epoxy ester formed from reacting 32 percent air drying fatty acids with 68 percent of the reaction product of Bisphenol A and a diglycidyl ether of Bisphenol A (Epon 829) was coated on to a panel and subjected to electron beam bombardment at 300 milliamps and a line speed of 35 feet per minute. The material was then tested for solvent resistance by rubbing with acetone until the coating was removed. The coating was able to withstand 15 rubs.

The coating material was then allowed to further cure by oxidation by leaving it on a shelf for one year. The coating was then retested by rubbing with alcohol and the coating was able to withstand 25 rubs without damage.

According to the provisions of the patent statutes, there is described above the invention and what are considered its best embodiments. However, within the scope of the appended claims, it is to be understood that the invention may be practiced otherwise than as specifically described.

We claim:
1. A method for preparing high solids films comprising subjecting a film of a mixture comprising
   a. a radiation sensitive liquid material; and
   b. a radiation insensitive thermosetting resin wherein said radiation sensitive liquid material is present in said mixture in an amount in the range of from about 20 to about 90 percent by weight and wherein said radiation insensitive thermosetting resin is present in said mixture in an amount in the range of from about 10 to about 80 percent by weight, to a member of either of the following two classes of crosslinking conditions:
   c. a first class consisting of ionizing irradiation and actinic light, or
   d. a second class consisting of oxidation, moisture and heating to partially cure said mixture and subsequently completely curing the remainder of said mixture by subjecting said partially cured mixture to a member of the other of said clases of curing conditions to form a film which is flexible and abrasion resistant.
2. The method of claim 1 wherein
   a. said radiation sensitive liquid material is selected from the group consisting of ethylenically unsaturated polyester resins solubilized in vinyl monomers, esters of acrylic acid, esters of methacrylic acid, amides of acrylic acid, amides of methacrylic acid, diacrylates, dimethylacrylates, triacrylates and trimethacrylates;
   b. said radiation insensitive thermosetting resin is selected from the group consisting of radiation insensitive thermosetting alkyd resins, radiation insensitive thermosetting polyurethane resins, radiation insensitive thermosetting acrylic resins, radiation insensitive thermosetting polyepoxide resins, radiation insensitive thermosetting aminoplast resins and radiation insensitive thermosetting phenolic resins;
   c. said first class consists of electron radiation having an energy of at least about 100,000 electron volts and ultraviolet light having a wavelength in the range of from about 180 to about 400 nanometers.
3. The method of claim 1 wherein
   a. said radiation sensitive liquid material is selected from the group consisting of ethylenically unsaturated polyester resins solubilized in vinyl monomers, esters of acrylic acid, esters of methacrylic adid, amides of acrylic acid, amides of methacrylic acid, diacrylates, dimethacrylates, triacrylates and trimethacrylates;
   b. said radiation insensitive thermosetting resin is selected from the group consisting of radiation insensitive thermosetting alkyd resins, radiation insensitive thermosetting polyurethane resins, radiation insensitive thermosetting acrylic resins and radiation insensitive thermosetting polyepoxide resins; and
   c. said first class consists of electron radiation having an energy of at least about 100,000 electron volts and ultraviolet light having a wavelength in the range of from about 180 to about 400 nanometers.
4. The method of claim 1 wherein said mixture is subjected to said first class of crosslinking conditions to partially cure said mixture and then said partially cured mixture is subjected to said second class of crosslinking conditions to form a film which is flexible and abrasion resistant.
5. The method of claim 1 wherein said mixture is subjected to said second class of crosslinking conditions to partially cure said mixture and then said partially cured mixture is subjected to said first class of crosslinking conditions to form a film which is flexible and abrasion resistant.

6. The method of claim 1 wherein said radiation insensitive thermosetting resin is a radiation insensitive thermosetting polyurethane resin.

7. The method of claim 6 wherein said second class of curing conditions is moisture.

8. The method of claim 1 wherein said radiation insensitive thermosetting resin is a radiation insensitive thermosetting alkyd resin.

9. The method of claim 8 wherein said second class of curing conditions is oxidation.

10. The method of claim 1 wherein said radiation insensitive thermosetting resin is a radiation insensitive thermosetting acrylic resin comprising an interpolymer of an unsaturated carboxylic acid amide and at least one other monomer having a $CH_2 = C<$ group, said interpolymer being characterized by having amido hydrogen atoms replaced by the structure $—RCHOR_1$, wherein R is selected from the group consisting of hydrogen and saturated lower aliphatic hydrocarbon radicals and $R_1$ is selected from the group consisting of hydrogen and lower alkyl radicals.

11. The method of claim 10 wherein said second class of crosslinking conditions is heating.

12. The method of claim 1 wherein said radiation insensitive thermosetting resin is a radiation insensitive thermosetting pollyepoxide resin.

13. The method of claim 12 wherein said second class of crosslinking conditions is oxidation.

14. The method of claim 1 wherein said mixture is subjected to a total dose of ionizing irradiation of from 0.2 to about 20 megarads.

15. A method for preparing high solids films comprising subjecting a film of a mixture comprising
 a. radiation sensitive liquid esters of acrylic acid; and
 b. radiation insensitive thermosetting polyurethane resin wherein said radiation sensitive liquid esters of acrylic acid are present in said mixture in an amount in the range of from about 20 to about 90 percent by weight and wherein said radiation insensitive thermosetting polyurethane resin is present in said mixture in an amount in the range of from about 10 to about 80 percent by weight, to a member of either of the following two classes of crosslinking conditions:
 c. a first class consisting of ionizing irradiation and actinic light, or
 d. a second class consisting of oxidation, moisture and heating to partially cure said mixture and subsequently completely curing the remainder of said mixture by subjecting said partially cured mixture to a member of the other said classes of curing conditions to form a film which is flexible and abrasion resistant.

* * * * *

UNITED STATES PATENT AND TRADEMARK OFFICE
CERTIFICATE OF CORRECTION

PATENT NO. : 4,025,407
DATED : May 24, 1977
INVENTOR(S) : Wen-Hsuan Chang and Marco Wismer It is certified that error appears in the above-identified patent and that said Letters Patent are hereby corrected as shown below:

Column 14, line 14, "clases" should be --classes--.

Column 14, line 43, "adid" should be --acid--.

Column 15, line 28, "pollyepoxide" should be --polyepoxide--.

Column 16, line 25, insert --of-- after "other".

Signed and Sealed this sixteenth Day of August 1977

[SEAL]

Attest:

RUTH C. MASON
Attesting Officer

C. MARSHALL DANN
Commissioner of Patents and Trademarks

Disclaimer 4,025,407.—*Wan-Hsuan Chang* and *Marco Wismer*, Gibsonia, Pa. METHOD FOR PREPARING HIGH SOLIDS FILMS EMPLOYING A PLURALITY OF CURING MECHANISMS. Patent dated May 24, 1977. Disclaimer filed Nov. 10, 1977, by the assignee, *PPG Industries, Inc.*

Hereby enters this disclaimer to claims 1, 2, 3, 4, 6, 7, 14 and 15 of said patent.

[*Official Gazette February 14, 1978.*]